US012754702B2

(12) United States Patent
Lai et al.

(10) Patent No.: US 12,754,702 B2
(45) Date of Patent: Oct. 6, 2026

(54) IMAGE PRESENTATION METHOD AND IMAGE PRESENTATION SYSTEM

(71) Applicant: Acer Incorporated, New Taipei City (TW)

(72) Inventors: Jia-Wei Lai, New Taipei City (TW); Hsi Lin, New Taipei City (TW); Chan-Jung Tsao, New Taipei City (TW); Kai-Ting Chang, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 31 days.

(21) Appl. No.: 18/936,918

(22) Filed: Nov. 4, 2024

(65) Prior Publication Data

US 2026/0072629 A1 Mar. 12, 2026

(30) Foreign Application Priority Data

Sep. 12, 2024 (TW) ................................ 113134568

(51) Int. Cl.

| | |
|---|---|
| ***G06F 3/14*** | (2006.01) |
| ***G06T 3/40*** | (2024.01) |
| ***G06T 7/70*** | (2017.01) |
| ***G06V 10/25*** | (2022.01) |
| ***H04N 23/61*** | (2023.01) |

(52) U.S. Cl.

CPC .................. *G06F 3/14* (2013.01); *G06T 3/40* (2013.01); *G06T 7/70* (2017.01); *G06V 10/25* (2022.01); *H04N 23/61* (2023.01)

(58) Field of Classification Search

CPC .... G06F 3/14; G06T 3/40; G06T 7/70; G06V 10/25; H04N 23/61

See application file for complete search history.

(56) References Cited

U.S. PATENT DOCUMENTS

2016/0150222 A1* 5/2016 Luo .................... G06F 3/04815 348/43

FOREIGN PATENT DOCUMENTS

| | | | |
|---|---|---|---|
| TW | I435160 | 4/2014 | |
| TW | I547901 | 9/2016 | |
| TW | 202309736 | 3/2023 | |
| TW | I822157 | 11/2023 | |
| TW | I837830 | 4/2024 | |
| WO | WO-2020126492 A1 * | 6/2020 | .......... G06F 3/0304 |

* cited by examiner

*Primary Examiner* — Abhishek Sarma
(74) *Attorney, Agent, or Firm* — JCIPRNET

(57) ABSTRACT

An image presentation method and an image presentation system are disclosed. The method includes: photographing a target object by an image capturing device continuously to obtain an image stream in a period that the image capturing device is in a moving state; detecting a first relative position between the image capturing device and the target object in a period that the image capturing device photographs the target object continuously; obtaining multiple images from the image stream according to the first relative position, where the images present the target object from different viewing angles respectively; detecting a second relative position between a user and a display; and presenting one of the images by the display according to the second relative position.

12 Claims, 6 Drawing Sheets

IMAGE PRESENTATION METHOD AND IMAGE PRESENTATION SYSTEM

CROSS-REFERENCE TO RELATED APPLICATION

This application claims the priority benefit of Taiwan application serial no. 113134568, filed on Sep. 12, 2024. The entirety of the above-mentioned patent application is hereby incorporated by reference herein and made a part of this specification.

BACKGROUND

Technical Field

The disclosure relates to an image presentation method and an image presentation system.

Description of Related Art

With the advancement of technology, users of smart mobile phones can capture their favorite images anytime and anywhere by smart mobile phones and store the favorite images as photos or short videos for sharing. However, common photos or short videos only allow users to view objects in the image from a single viewing angle, or at most allow users to view panoramic images by rotating the mobile phone. For three-dimensional (3D) objects of interest in the image, users cannot intuitively view the three-dimensional objects in the image from different viewing angles by methods such as turning their heads.

SUMMARY

In view of this, the disclosure provides an image presentation method and an image presentation system, which can improve the aforementioned problems.

An embodiment of the disclosure provides an image presentation method. The method includes following steps. A target object is photographed by an image capturing device continuously to obtain an image stream in a period that the image capturing device is in a moving state. A first relative position between the image capturing device and the target object is detected in the period that the image capturing device photographs the target object continuously. Multiple images are captured from the image stream according to the first relative position, where the images present the target object from different viewing angles. A second relative position between a user located in front of a display and the display is detected. One of the images is presented by the display according to the second relative position.

Another embodiment of the disclosure provides an image presentation system including an image capturing device, a display, and a processor. The processor is coupled to the image capturing device and the display. The processor is configured to: photograph a target object by the image capturing device continuously to obtain an image stream in a period that the image capturing device is in a moving state; detect a first relative position between the image capturing device and the target object in the period that the image capturing device photographs the target object continuously; capture multiple images from the image stream according to the first relative position, where the images present the target object from different viewing angles; detect a second relative position between a user located in front of the display and the display; and present one of the images by the display according to the second relative position.

Based on the above, the image capturing device may photograph the target object continuously to obtain an image stream in the period that the image capturing device is in the moving state. Meanwhile, in the period that the image capturing device photographs the target object continuously, the first relative position between the image capturing device and the target object may be detected. According to the first relative position, the images may be captured from the image stream. Specifically, the images may present the target object from different viewing angles respectively. When the user is located in front of the display, the second relative position between the user and the display may be detected. According to the second relative position, one of the images may be presented by the display. In other words, when the image is played subsequently, for the target object presented in the image, the user may intuitively view the target object from different viewing angles by methods such as turning the head of the user. Thereby, the user experience may be effectively enhanced.

DESCRIPTION OF THE EMBODIMENTS

Figure 1:
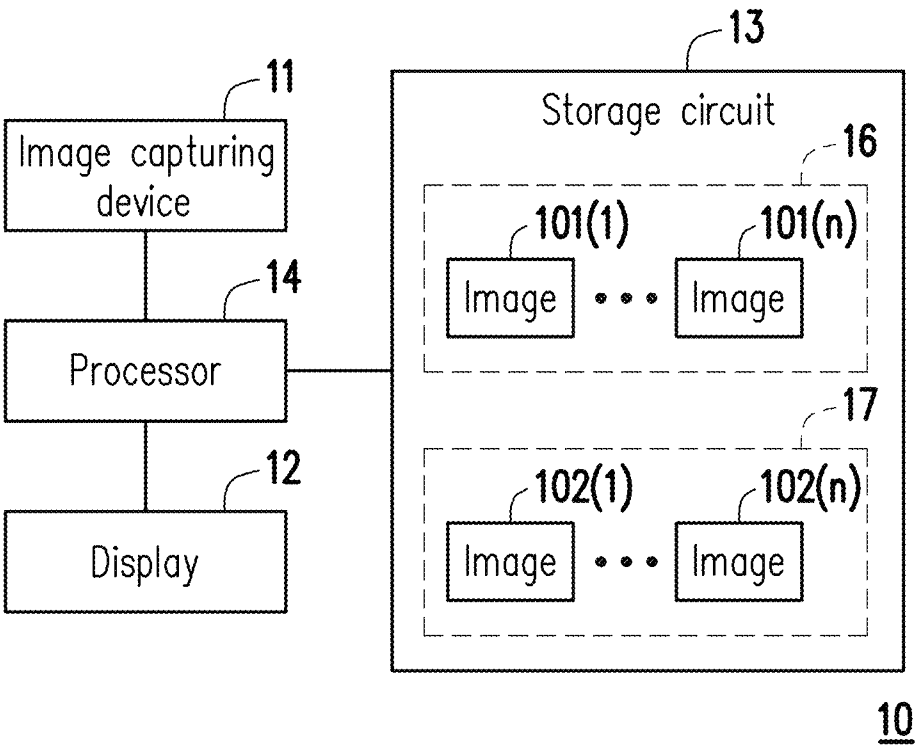
FIG. 1 is a schematic diagram of an image presentation system according to an embodiment of the disclosure.

FIG. 1 is a schematic diagram of an image presentation system according to an embodiment of the disclosure. Referring to FIG. 1, an image presentation system 10 may be implemented as various electronic devices supporting different functions like image capturing, image processing, and image presentation, such as a smart mobile phone, a tablet computer, a laptop computer, a camera, or a game console, and the type of the electronic device is not limited thereto.

The image presentation system 10 includes an image capturing device 11, a display 12, a storage circuit 13, and a processor 14. The image capturing device 11 is configured to photograph an external image and generate an image stream. The image stream may reflect the image content of the external image captured by the image capturing device 11. For example, the image capturing device 11 may include necessary components configured to realize the function of image capturing, such as a lens and a photosensitive element.

The display 12 is configured to display an image. For example, the display 12 may include a plasma display, a liquid-crystal display (LCD), a thin film transistor liquid crystal display (TFT-LCD), an organic light-emitting diode (OLED), and an LED display, and the type of the display 12 is not limited to thereto.

The storage circuit 13 is configured to store data. For example, the storage circuit 13 may include a volatile storage circuit and a non-volatile storage circuit. The volatile storage circuit is configured to store data volatilely. For example, the volatile storage circuit may include a random access memory (RAM) or similar volatile storage media. The non-volatile storage circuit is configured to store data non-volatilely. For example, the non-volatile storage circuit may include a read only memory (ROM), a solid state disk (SSD), a hard disk drive (HDD), or similar non-volatile storage media. However, the disclosure does not limit the quantity and type of the storage circuit 13.

The processor 14 is coupled to the image capturing device 11, the display 12, and the storage circuit 13. The processor 14 is configured to be responsible for the overall or partial operation of the image presentation system 10. For example, the processor 14 may include a central processing unit (CPU), a graphic processing unit (GPU), or a programmable microprocessor for a common purpose or a specific purpose, a digital signal processor (DSP), a programmable controller, an application specific integrated circuit (ASIC), a programmable logic device (PLD), or other similar devices, or a combination thereof.

In an embodiment, the processor 14 may further include specialized processors for assisting in neural network computations and/or image processing, such as a vision processing unit (VPU), a neural network processing unit (NPU), and/or a tensor processing unit (TPU). However, the disclosure does not limit the quantity and type of the processor 14.

In an embodiment, the image capturing device 11, the display 12, the storage circuit 13, and the processor 14 may be implemented in a single electronic device. In an embodiment, at least one of the image capturing device 11, the display 12, the storage circuit 13, and the processor 14 may be distributed in one or more electronic devices.

In an embodiment, the image capturing device 11 may be independent from the electronic device including the display 12, the storage circuit 13, and the processor 14. In an embodiment, the image capturing device 11 may include a handheld, movable, or pluggable image capturing device.

In an embodiment, in a period that the image capturing device 11 is in a moving state, the processor 14 may photograph a specific object (also called a target object) by the image capturing device 11 continuously to obtain an image stream 16. The image stream 16 may include images 101(1) to 101(*n*). The processor 14 may store the image stream 16 (and the images 101(1) to 101(*n*)) in the storage circuit 13.

In an embodiment, in the period that the image capturing device 11 is in the moving state, a user may move the image capturing device 11 and photograph the images 101(1) to 101(*n*) by the moving image capturing device 11. The images 101(1) to 101(*n*) may present at least one target object from different viewing angles respectively. The processor 14 may generate the image stream 16 according to the images 101(1) to 101(*n*).

In an embodiment, the processor 14 may detect a relative position (also called a first relative position) between the image capturing device 11 and the target object in the period that the image capturing device 11 photographs the target object (and in the period that the image capturing device 11 is in the moving state) continuously. For example, in the period that the image capturing device 11 is in the moving state and photographs the target object continuously, a sensor inside the image capturing device 11 may generate a sensing signal continuously. The sensing signal may reflect a position (or a position change) of the image capturing device 11. The processor 14 may infer the current relative position (that is, the first relative position) between the image capturing device 11 and the target object according to the sensing signal. Moreover, when the sensing signal reflects a change in the position of the image capturing device 11, the processor 14 may update the relative position (that is, the first relative position) between the image capturing device 11 and the target object according to the sensing signal. For example, the sensor may include a gravity sensor (G-sensor), a gyroscope, and/or an accelerometer, and the type of the sensor is not limited to thereto.

In an embodiment, the processor 14 may capture multiple images 102(1) to 102(*n*) from the image stream 16 according to the relative position (that is, the first relative position) between the image capturing device 11 and the target object. For example, the image 102(*j*) may be captured from the image 101(*j*), and the image 102(*k*) may be captured from the image 101(*k*). Similar to the images 101(1) to 101(*n*), the images 102(1) to 102(*n*) may present the target object from different viewing angles respectively. The processor 14 may store the images 102(1) to 102(*n*) in the storage circuit 13. In an embodiment, the processor 14 may store an image collection 17 including the images 102(1) to 102(*n*) in the storage circuit 13. Subsequently, the images in the image collection 17 may be configured to play on the display 12 to present images related to the target object.

In an embodiment, the relative position (that is, the first relative position) between the image capturing device 11 and the target object includes a relative position (also called a first sub-relative position) between the image capturing device 11 and the target object when the target object is photographed by the image capturing device 11 to obtain the image 101(*j*) (also called a first image) from the image stream 16. According to the first sub-relative position, the processor 14 may confirm a target area (also called a first target area) in the image 101(*j*).

It should be noted that the first target area in the image 101(*j*) is decided according to the first sub-relative position. Therefore, a position of the first target area in the image 101(*j*) is affected by the first sub-relative position. For example, when the first sub-relative position changes, the position of the first target area in the image 101(*j*) changes correspondingly.

After confirming the first target area, the processor 14 may capture the image 102(*j*) (also called a first sub-image) from the first target area in the image 101(*j*), to serve as one of the images 102(1) to 102(*n*). In other words, the processor 14 may set the image 102(*j*) captured from the first target area as one of the images 102(1) to 102(*n*).

In an embodiment, the relative position (that is, the first relative position) between the image capturing device 11 and the target object further includes another relative position (also called a second sub-relative position) between the image capturing device 11 and the target object when the target object is photographed by the image capturing device 11 to obtain the image 101(*k*) (also called a second image) from the image stream 16. The second sub-relative position is different from the first sub-relative position. According to the second sub-relative position, the processor 14 may confirm a target area (also called a second target area) in the image 101(*k*). It should be noted that both j and k are integers between 1 and n, and j is not equal to k.

It should be noted that the second target area in the image 101(*k*) is decided according to the second sub-relative position. Therefore, a position of the second target area in the image 101(*k*) is affected by the second sub-relative position. For example, when the second sub-relative position changes, the position of the second target area in the image 101(*k*) changes correspondingly. Moreover, since the second sub-relative position is different from the first sub-relative position, the position of the second target area in the second image is also different from the position of the first target area in the first image.

After confirming the second target area, the processor 14 may capture the image 102(*k*) (also called a second sub-image) from the second target area in the image 101(*k*), to serve as another one of the images 102(1) to 102(*n*). In other words, the processor 14 may set the image 102(*k*) captured from the second target area as another one of the images 102(1) to 102(*n*). By analogy, the processor 14 may capture the images 102(1) to 102(*n*) from the image stream 16 sequentially.

In an embodiment, the processor 14 may obtain resolution information. For example, this resolution information may be input by the user or obtained from the display 12. The resolution information may reflect the resolution of the display 12. For example, the resolution information may reflect that the resolution of the display 12 is 1920×1440 or other values, which is not limited by the disclosure. According to the resolution information, the processor 14 may decide a size of the target area (for example, the first target area and/or the second target area). For example, the size of the target area may be expressed as a width and a height of the target area. The processor 14 may decide the width and the height of the target area according to the resolution information. For example, assuming the resolution information reflects that the resolution of the display 12 is 1920×1440, the processor 14 may set a ratio (also called an aspect ratio) of the width to the height of the target area (that is, the first target area and/or the second target area) to 1920:1440 (that is, 4:3), and so on. In an embodiment, the size (for example, the aspect ratio) of the target area (for example, the first target area and/or the second target area) may also be a preset value or may be customized by the user.

In an embodiment, after obtaining the images 102(1) to 102(*n*) (or the image collection 17), the processor 14 may detect the relative position (also called a second relative position) between the user and the display 12 when the user is located in front of the display 12. For example, the processor 14 may capture an image (also called a user image) in front of the display 12 by a front lens of the display 12 or any image capturing device (for example, the image capturing device 11) which may capture the image in front of the display 12. The processor 14 may analyze the user image to detect the relative position (that is, the second relative position) between the user and the display 12. For example, the processor 14 may analyze the user image to detect the position of the user in the user image, thereby inferring the relative position (that is, the second relative position) between the user and the display 12 according to the position.

In an embodiment, the processor 14 may present one of the images 102(1) to 102(*n*) by the display 12 according to the relative position (that is, the second relative position) between the user and the display 12. For example, when the relative position (that is, the second relative position) between the user and the display 12 is the aforementioned first sub-relative position, the processor 14 may present the image 102(*j*) (that is, the first sub-image) by the display 12. Alternatively, when the relative position (that is, the second relative position) between the user and the display 12 is the aforementioned second sub-relative position, the processor 14 may present the image 102(*k*) (that is, the second sub-image) by the display 12. Thereby, in the period that the display 12 plays the image collection 17, the user may change the relative position (that is, the second relative position) between the user and the display 12 to control the display 12 to present a specific image in the image collection 17.

Figure 2:
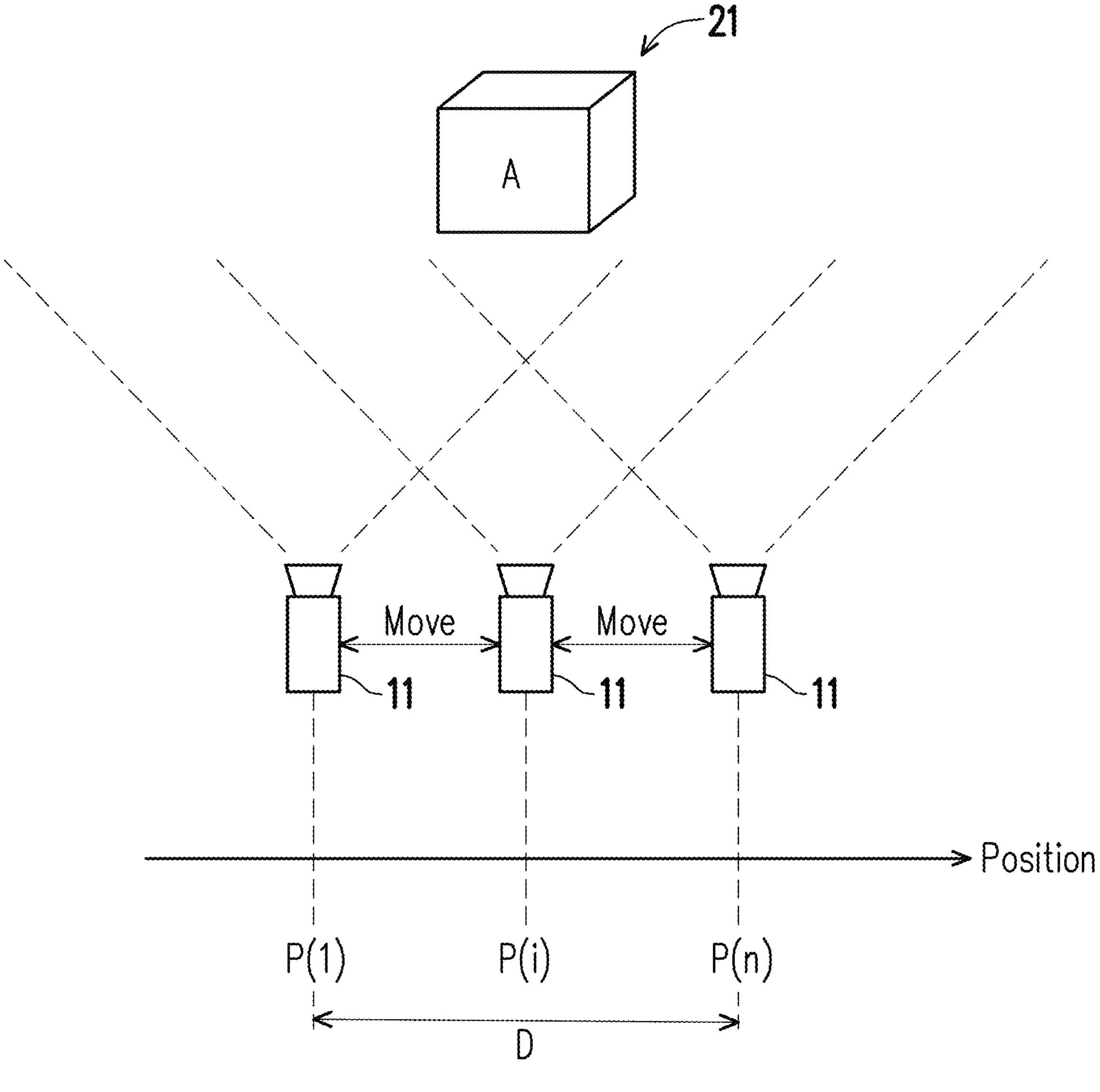
FIG. 2 is a schematic diagram illustrating the continuous photographing of a target object by an image capturing device to obtain an image stream in a period that the image capturing device is in a moving state, according to an embodiment of the disclosure.

FIG. 2 is a schematic diagram illustrating the continuous photographing of a target object by an image capturing device to obtain an image stream in a period that the image capturing device is in a moving state, according to an embodiment of the disclosure. Referring to FIG. 1 and FIG. 2, it is assumed that a surface A of a target object 21 faces the image capturing device 11, and the image capturing device 11 may move along a single axis (for example, left and right) between positions P(1) to P(n). Furthermore, it is assumed that the image capturing device 11 may directly face the target object 21 at position P(i), as shown in FIG. 2, where i may be an integer between 1 and n.

In an embodiment, a distance between the positions P(1) to P(n) may be D. The value of D may be affected by an image capturing range of the lens of the image capturing device 11. For example, the value of D may be positively correlated with the image capturing range of the lens of the image capturing device 11. That is, if the image capturing range of the lens of the image capturing device 11 is larger, the value of D may be larger.

In an embodiment, in the period that the image capturing device 11 is in a moving state (for example, moving between the positions P(1) to P(n)), the image capturing device 11 may photograph the target object 21 continuously to obtain the image stream 16. It should be noted that the relative position (that is, the first relative position) between the image capturing device 11 and the target object 21 changes correspondingly in the period that the image capturing device 11 is in a moving state (for example, moving between the positions P(1) to P(n)). Therefore, in the period that the image capturing device 11 is in a moving state (for example, moving between the positions P(1) to P(n)), the image capturing device 11 may photograph the target object 21 (that is, the images 101(1) to 101(*n*)) continuously from different viewing angles.

In an embodiment, when the image capturing device 11 is located at (or moves to) the position P(j), the relative position between the image capturing device 11 and the target object 21 may be the aforementioned first sub-relative position. At this time, the image capturing device 11 may photograph the target object 21 at the position P(j) to obtain image 101(*j*) based on the viewing angle corresponding to the position P(j). In an embodiment, when the image capturing device 11 is located at (or moves to) the position P(k), the relative position between the image capturing device 11 and the target object 21 may be the aforementioned second sub-relative position. At this time, the image capturing device 11 may photograph the target object 21 at the position P(k) to obtain image 101(*k*) based on the viewing angle corresponding to the position P(k).

Figure 3:
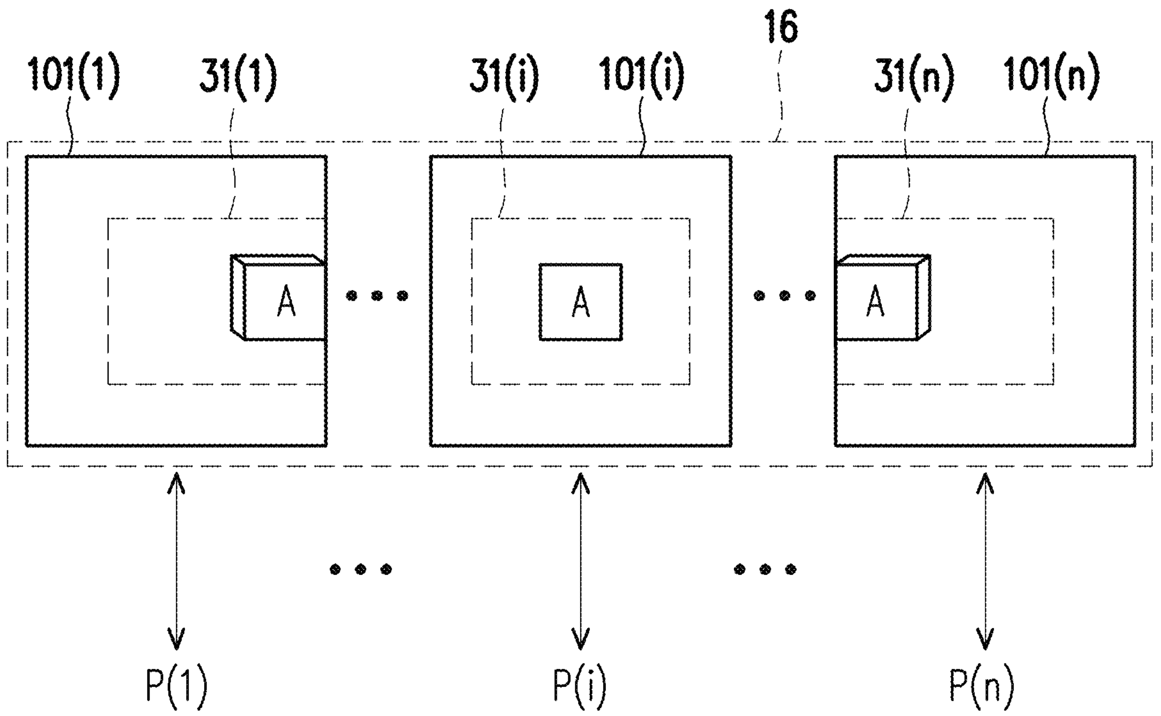
FIG. 3 is a schematic diagram of multiple images in an image stream according to an embodiment of the disclosure.

FIG. 3 is a schematic diagram of multiple images in an image stream according to an embodiment of the disclosure. Referring to FIG. 2 and FIG. 3, the images 101(1) to 101(*n*) in the image stream 16 correspond to the positions P(1) to P(n) respectively. For example, the images 101(1) to 101(*n*)

are the images captured by the image capturing device 11 when the image capturing device 11 is located at (or moves to) the positions P(1) to P(n) respectively. Therefore, the viewing angles of the target object 21 presented in the images 101(1) to 101(*n*) are also different from each other, as shown in FIG. 3.

In an embodiment, the processor 14 may decide target areas 31(1) to 31(*n*) in the images 101(1) to 101(*n*) respectively according to the current position (or the first relative position) of the image capturing device 11 when capturing the images 101(1) to 101(*n*). For example, the processor 14 may decide the target area 31(*j*) in the image 101(*j*) according to the current position P(j) (or the first sub-relative position) of the image capturing device 11 when capturing the image 101(*j*). The size (or the resolution) of the target area 31(*j*) may be smaller than the size (or the resolution) of the image 101(*j*). Alternatively, the processor 14 may decide the target area 31(*k*) in the image 101(*k*) according to the current position P(k) (or the second sub-relative position) of the image capturing device 11 when capturing the image 101(*k*). The size (or the resolution) of the target area 31(*k*) may be smaller than the size (or the resolution) of the image 101(*k*). It should be noted that since the position P(j) (or the first sub-relative position) is different from the position P(k) (or the second sub-relative position), the position of the target area 31(*j*) in the image 101(*j*) may be different from the position of the target area 31(*k*) in the image 101(*k*). It should be noted that the image of the target object 21 is included in all of the target areas 31(1) to 31(*n*).

Figure 4:
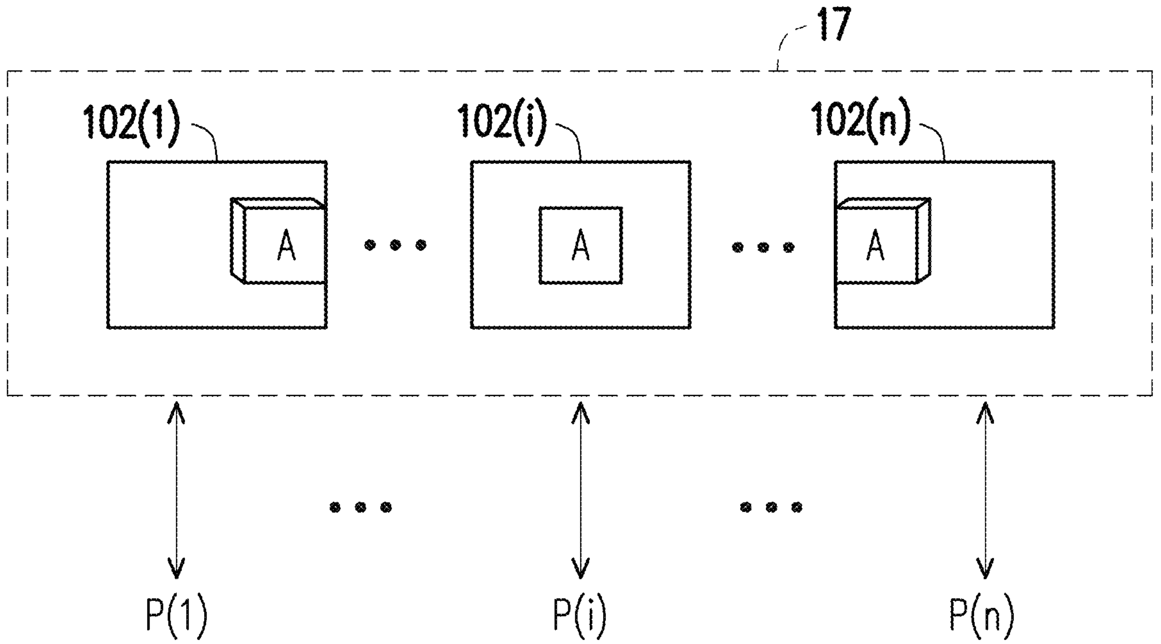
FIG. 4 is a schematic diagram illustrating the capturing of multiple images from an image stream according to a first relative position, according to an embodiment of the disclosure.

FIG. 4 is a schematic diagram illustrating the capturing of multiple images from an image stream according to a first relative position, according to an embodiment of the disclosure. Referring to FIG. 2 to FIG. 4, the processor 14 may capture the images 102(1) to 102(*n*) from the target areas 31(1) to 31(*n*) respectively. For example, the processor 14 may capture the image 102(*j*) from the target area 31(*j*) and capture the image 102(*k*) from the target area 31(*k*). The images 102(1) to 102(*n*) correspond to the positions P(1) to P(n) respectively. Similar to the images 101(*j*) and 101(*k*), the images 102(*j*) and 102(*k*) also present the target object 21 from different viewing angles, as shown in FIG. 4. The processor 14 may add the images 102(1) to 102(*n*) to the image collection 17.

Figure 5:
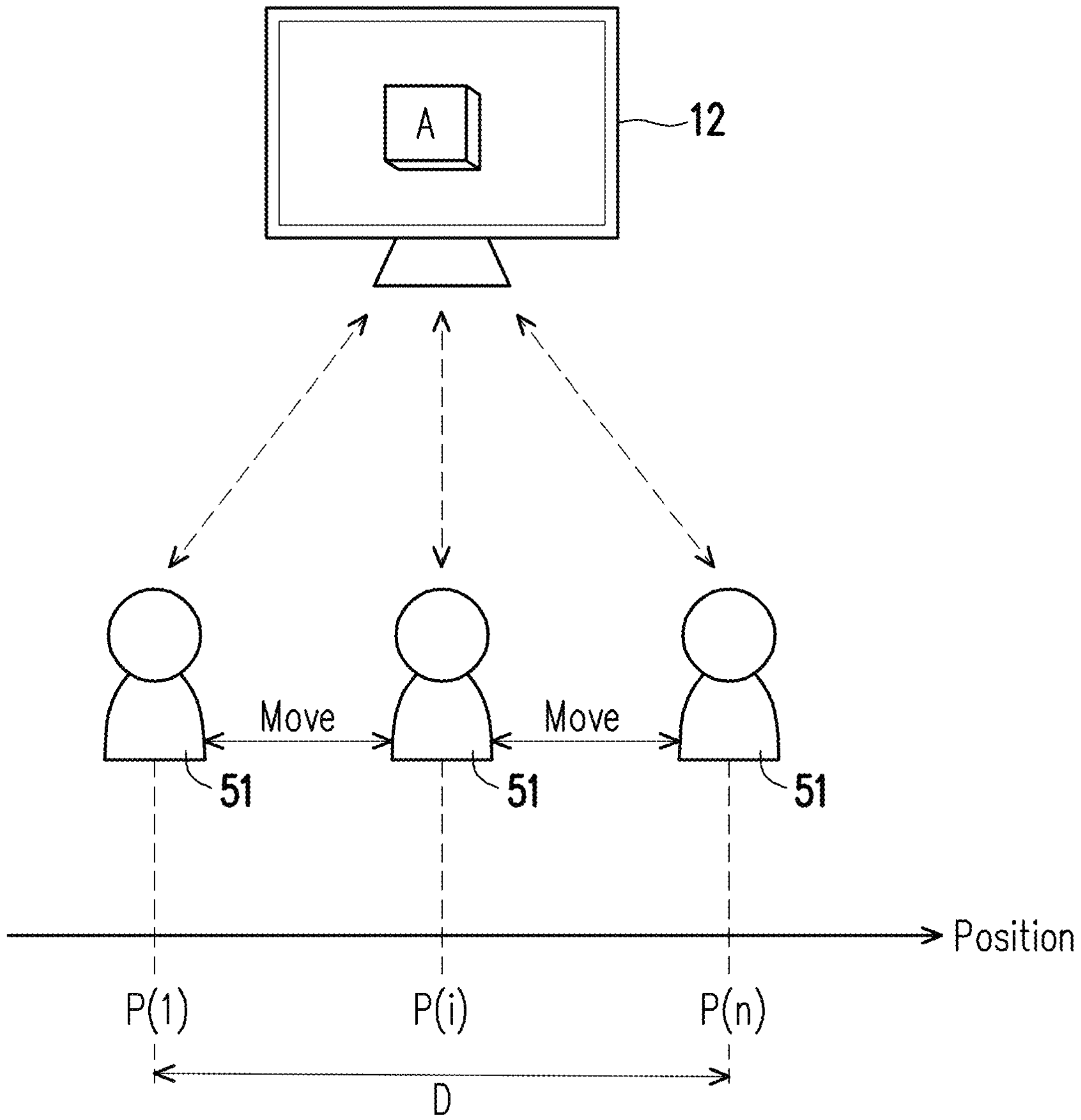
FIG. 5 is a schematic diagram illustrating the presentation of one of multiple images by a display according to a second relative position, according to an embodiment of the disclosure.

FIG. 5 is a schematic diagram illustrating the presentation of one of multiple images by a display according to a second relative position, according to an embodiment of the disclosure. Referring to FIG. 2 to FIG. 5, after establishing the image collection 17, the processor 14 may detect the relative position (that is, the second relative position) between a user 51 and the display 12 when the user 51 is located in front of the display 12. According to the second relative position, the processor 14 may present a corresponding image (for example, one of the images 102(1) to 102(*n*)) in the image collection 17 by the display 12.

In an embodiment, in front of the display 12, the user 51 may move between the positions P(1) to P(n). Similar to FIG. 2, by moving between the positions P(1) to P(n), the relative position (that is, the second relative position) between the user 51 and the display 12 may change correspondingly. For example, when the user 51 is located at (or moves to) the position P(j), the relative position between the user 51 and the display 12 may be the aforementioned first sub-relative position. Furthermore, when the user 51 is located at (or moves to) the position P(k), the relative position between the user 51 and the display 12 may be the aforementioned second sub-relative position.

In an embodiment, when the user 51 is located at (or moves to) the position P(j) (that is, the relative position between the user 51 and the display 12 is the first sub-relative position), the processor 14 may present the image 102(*j*) (that is, the first sub-image) by the display 12. Alternatively, when the user 51 is located at (or moves to) the position P(k) (that is, the relative position between the user 51 and the display 12 is the second sub-relative position), the processor 14 may present the image 102(*k*) (that is, the second sub-image) by the display 12.

In an embodiment, in the period that the display 12 plays the image collection 17, the user 51 may change the relative position (that is, the second relative position) between the user 51 and the display 12 to control the display 12 to present the specific image in the image collection 17, and view the target object 21 presented by the specific image (or the display 12) based on the specific viewing angle corresponding to the current relative position.

In an embodiment, presenting one of the images 102(1) to 102(*n*) according to the relative position (that is, the second relative position) between the user 51 and the display 12 may simulate the change in the viewing angle of the user 51 as the relative position between the user 51 and the target object 21 changes, and adjust the viewing angle from which the user 51 views the target object 21 by the display 12 according to a change (also called a viewing angle change). Thereby, the sense of presence may be effectively enhanced when the user 51 views the (three-dimensional) image of the target object by the display 12.

Figure 6:
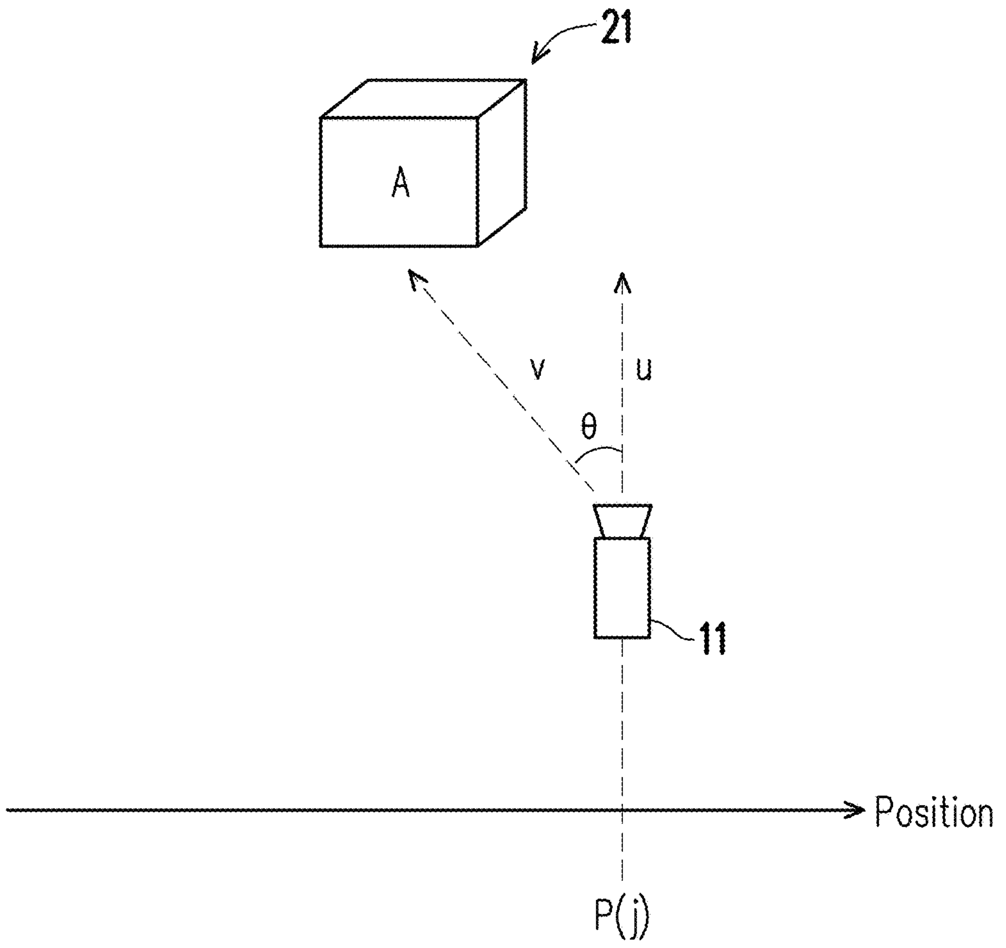
FIG. 6 and FIG. 7 are schematic diagrams illustrating the determination of a target area according to a first relative position, according to an embodiment of the disclosure.
Figure 7:
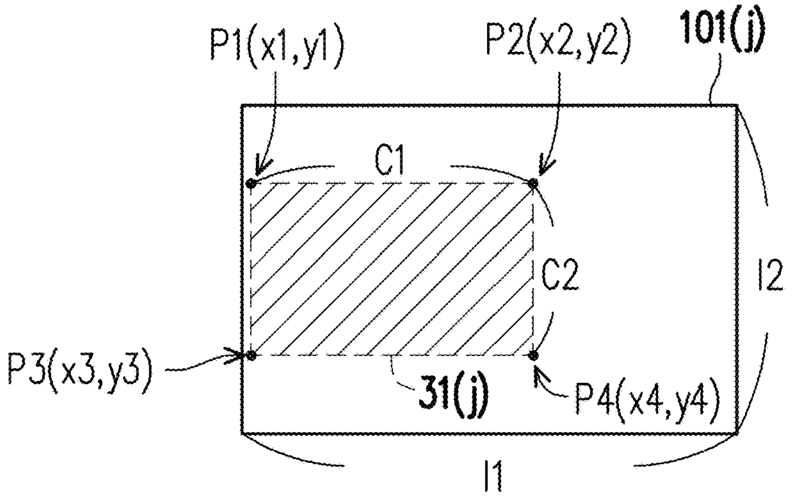

FIG. 6 and FIG. 7 are schematic diagrams illustrating the determination of a target area according to a first relative position, according to an embodiment of the disclosure. Referring to FIG. 6 and FIG. 7, and taking the image 101(*j*) as an example, the processor 14 may capture the image 101(*j*) by the image capturing device 11 when the image capturing device 11 is located at the position P(j). At this time, an angle between the image capturing device 11 and the target object 21 in a preset direction is Θ. For example, the angle Θ is between a vector u and a vector v. The vector u points in the preset direction, while the vector v points towards the target object 21. In an embodiment, the angle Θ may be configured to represent the relative position (that is, the first relative position) between the image capturing device 11 and the target object 21. It should be noted that the relative position (that is, the first relative position) between the image capturing device 11 and the target object 21 may also be represented in other forms, which is not limited by the disclosure.

In an embodiment, the processor 14 may decide the target area 31(*j*) in the image 101(*j*) according to the angle Θ (reflecting the first relative position). For example, the processor 14 may decide coordinates of four endpoints P1 to P4 of the target area 31(*j*) according to the angle Θ, namely P1(x1, y1), P2(x2, y2), P3(x3, y3), and P4(x4, y4).

In an embodiment, the processor 14 may decide the coordinates of the endpoints P1 to P4 according to the following equations (1.1) to (1.5).

$$xj = \left(((I1/2) - (C1/2)) \Big/ \left(\tan\left(\Theta h/2\right)\right)\right) \times \tan(\Theta) \tag{1.1}$$

$$P1(x1,\ y1) = [((I1/2) + xj - (C1/2),\ ((I2/2) - (C2/2)] \tag{1.2}$$

$$P2(x2,\ y2) = [((I1/2) + xj + (C1/2),\ ((I2/2) - (C2/2)] \tag{1.3}$$

-continued $$P3(x3, y3) = [((I1/2) + xj - (C1/2), ((I2/2) + (C2/2)] \quad (1.4)$$

$$P4(x4, y4) = [((I1/2) + xj + (C1/2), ((I2/2) + (C2/2)] \quad (1.5)$$

In equations (1.1) to (1.5), a parameter I1 represents the width of the image 101(*j*), a parameter I2 represents the height of the image 101(*j*), a parameter C1 represents the width of the target area 31(*j*), a parameter I2 represents the height of the target area 31(*j*), and a parameter Θh represents a horizontal field of view (HFOV) of the lens of the image capturing device 11. It should be noted that the equations (1.1) to (1.5) may all be adjusted according to practical requirements, which is not limited by the disclosure.

In an embodiment, the processor 14 may input multiple consecutive images in the images 102(1) to 102(*n*) into an image processing model (also called a first image processing model). The processor 14 may generate at least one image (also called an additional image) based on the input multiple consecutive images by the first image processing model. Then, the processor 14 may add the additional image to the images 102(1) to 102(*n*) (that is, the image collection 17) to expand the quantity of images 102(1) to 102(*n*) (that is, the images in the image collection 17). In an embodiment, the first image processing model may include a generative image processing model. It should be noted that how to design the first image processing model (that is, the generative image processing model) belongs to the known technology in the field of image processing technology, which is not repeated here.

In an embodiment, it is assumed that the current image collection 17 lacks an image 102(*r*+1) between consecutively captured images 102(*r*) and 102(*r*+2). The processor 14 may input the images 102(*r*) and 102(*r*+2) into the first image processing model for processing. The first image processing model may generate the originally non-existent image 102(*r*+1) based on the images 102(*r*) and 102(*r*+2). For example, the images 102(*r*), 102(*r*+1), and 102(*r*+2) correspond to positions P(r), P(r+1), and P(r+2) in FIG. 4, respectively. Then, the processor 14 may add the image 102(*r*+1) to the image collection 17. Thereby, a total number (and density) of images corresponding to different first relative positions in the image collection 17 may be increased.

In an embodiment, the processor 14 may input at least one of the images 102(1) to 102(*n*) (for example, the image 102(*j*)) into another image processing model (also called a second image processing model). The processor 14 may perform a resolution enlargement on the input image by the second image processing model to increase the resolution of the input image. In an embodiment, the resolution enlargement is also called super-resolution. It should be noted that how to design the second image processing model belongs to the known technology in the field of image processing technology, which is not repeated here.

Figure 8:
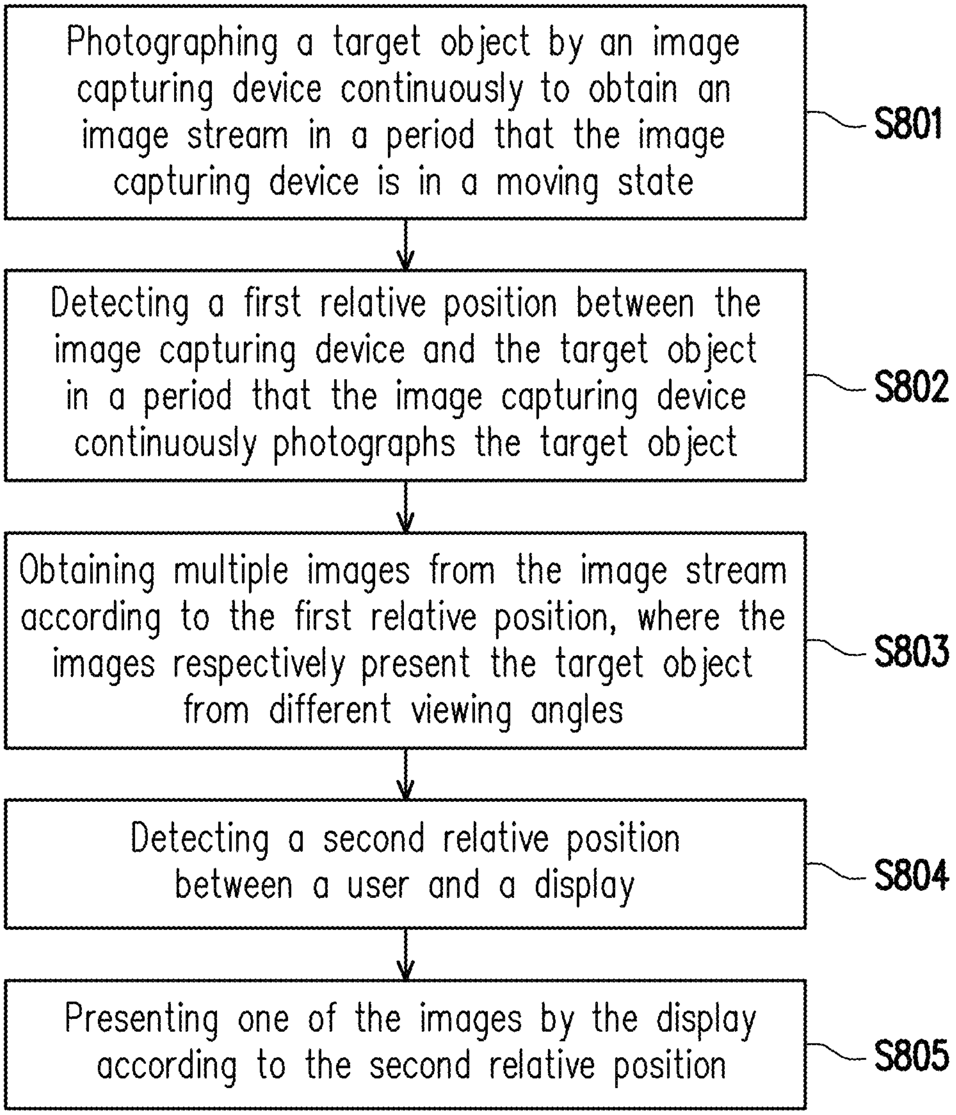
FIG. 8 is a flowchart of an image presentation method according to an embodiment of the disclosure.

FIG. 8 is a flowchart of an image presentation method according to an embodiment of the disclosure. With reference to FIG. 8, in step S801, in the period that the image capturing device is in the moving state, the target object is continuously photographed by the image capturing device to obtain an image stream. In step S802, the first relative position between the image capturing device and the target object is detected in the period that the image capturing device photographs the target object continuously. In step S803, the images are captured from the image stream according to the first relative position, where the images present the target object from different viewing angles respectively. In step S804, the second relative position between a user located in front of the display and the display is detected. In step S805, one of the images is presented by the display according to the second relative position.

However, each step in FIG. 8 has been described in detail as above, which is not repeated here. It is worth noting that each step in FIG. 8 may be implemented as multiple codes or circuits, which is not limited by the disclosure. In addition, the method of FIG. 8 may be used in conjunction with the above exemplary embodiments or may be used independently, which is not limited by the disclosure.

In summary, the image presentation method and the image presentation system proposed by the embodiments of the disclosure may photograph the target object by the image capturing device continuously to obtain the image stream in the period that the image capturing device is in the moving state. Next, according to the first relative position between the image capturing device and the target object in the period that the image capturing device photographs the target object continuously, the corresponding images are captured from the image stream and thereby establish the image collection related to the target object. Subsequently, in a period that the image collection plays, according to the second relative position between the user located in front of the display and the display, the display may present the image in the image collection capturing the target object based on a specific viewing angle. Thereby, the sense of presence can be effectively enhanced when the user views the (three-dimensional) image of the target object by the display.

Although the disclosure has been disclosed by the above embodiments, it is not intended to limit the disclosure. Any person skilled in the art may make some modifications and refinements without departing from the spirit and scope of the disclosure. Therefore, the protection scope of the disclosure should be defined by the appended claims.

What is claimed is:

1. An image presentation system, comprising:

an image capturing device;

a display; and a processor, coupled to the image capturing device and the display, wherein the processor is configured to:

photograph a target object by the image capturing device continuously to obtain an image stream in a period that the image capturing device is in a moving state;

detect a first relative position between the image capturing device and the target object in the period that the image capturing device photographs the target object continuously;

capture a plurality of images from the image stream according to the first relative position, wherein the plurality of images present the target object from different viewing angles;

detect a second relative position between a user located in front of the display and the display;

present one of the plurality of images by the display according to the second relative position;

input a plurality of consecutive images in the plurality of images into a first image processing model;

generate at least one additional image based on the plurality of consecutive images by the first image processing model; and add the at least one additional image to the plurality of images to expand a quantity of the plurality of images.

2. The image presentation system according to claim 1, wherein the first relative position comprises a first sub-relative position between the image capturing device and the target object when the target object is photographed by the image capturing device to obtain a first image form the image stream, and the operation in which the processor captures the plurality of images from the image stream by the processor according to the first relative position comprises:

confirming a first target area in the first image according to the first sub-relative position; and capturing a first sub-image from the first target area, to serve as one of the plurality of images.

3. The image presentation system according to claim 2, wherein the first relative position further comprises a second sub-relative position between the image capturing device and the target object when the target object is photographed by the image capturing device to obtain a second image from the image stream, the second sub-relative position is different from the first sub-relative position, and the operation in which the processor captures the plurality of images from the image stream by the processor according to the first relative position comprises:

confirming a second target area in the second image according to the second sub-relative position, wherein a position of the second target area in the second image is different from a position of the first target area in the first image; and capturing a second sub-image from the second target area, to serve as another one of the plurality of images.

4. The image presentation system according to claim 2, wherein the processor is further configured to:

obtain resolution information, wherein the resolution information reflects a resolution of the display; and decide a size of the first target area according to the resolution information.

5. The image presentation system according to claim 1, wherein the operation in which the processor presents one of the plurality of images by the display according to the second relative position comprises:

presenting a first sub-image in the plurality of images by the display when the second relative position is a first sub-relative position; and presenting a second sub-image in the plurality of images by the display when the second relative position is a second sub-relative position, wherein the first sub-relative position is different from the second sub-relative position, and the first sub-image is different from the second sub-image.

6. The image presentation system according to claim 1, wherein the processor is further configured to:

input at least one of the plurality of images into a second image processing model; and perform a resolution enlargement on the at least one of the plurality of images by the second image processing model.

7. An image presentation method, comprising:

photographing a target object by an image capturing device continuously to obtain an image stream in a period that the image capturing device is in a moving state;

detecting a first relative position between the image capturing device and the target object in the period that the image capturing device photographs the target object continuously;

capturing a plurality of images from the image stream according to the first relative position, wherein the plurality of images present the target object from different viewing angles;

detecting a second relative position between a user located in front of a display and the display;

presenting one of the plurality of images by the display according to the second relative position;

inputting a plurality of consecutive images in the plurality of images into a first image processing model;

generating at least one additional image based on the plurality of consecutive images by the first image processing model; and adding the at least one additional image to the plurality of images to expand a quantity of the plurality of images.

8. The image presentation method according to claim 7, wherein the first relative position comprises a first sub-relative position between the image capturing device and the target object when the target object is photographed by the image capturing device to obtain a first image from the image stream, and the step of capturing the plurality of images from the image stream according to the first relative position comprises:

confirming a first target area in the first image according to the first sub-relative position; and capturing a first sub-image from the first target area, to serve as one of the plurality of images.

9. The image presentation method according to claim 8, wherein the first relative position further comprises a second sub-relative position between the image capturing device and the target object when the target object is photographed by the image capturing device to obtain a second image from the image stream, the second sub-relative position is different from the first sub-relative position, and the step of capturing the plurality of images from the image stream according to the first relative position comprises:

confirming a second target area in the second image according to the second sub-relative position, wherein a position of the second target area in the second image is different from a position of the first target area in the first image; and capturing a second sub-image from the second target area, to serve as another one of the plurality of images.

10. The image presentation method according to claim 8, further comprising:

obtaining resolution information, wherein the resolution information reflects a resolution of the display; and deciding a size of the first target area according to the resolution information.

11. The image presentation method according to claim 7, wherein the step of presenting one of the plurality of images by the display according to the second relative position comprises:

presenting a first sub-image in the plurality of images by the display when the second relative position is a first sub-relative position; and presenting a second sub-image in the plurality of images by the display when the second relative position is a second sub-relative position, wherein the first sub-relative position is different from the second sub-relative position, and the first sub-image is different from the second sub-image.

12. The image presentation method according to claim 7, further comprising:

inputting at least one of the plurality of images into a second image processing model; and performing a resolution enlargement on the at least one of the plurality of images by the second image processing model.

* * * * *